J. F. O'CONNOR.
VEHICLE SHOCK ABSORBER
APPLICATION FILED JULY 25, 1914.

1,181,918.

Patented May 2, 1916.

WITNESSES:
Wm Geiger
Carrie G Ranz

INVENTOR.
John F. O'Conn.
BY
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

VEHICLE SHOCK-ABSORBER.

1,181,918. Specification of Letters Patent. Patented May 2, 1916.

Application filed July 25, 1914. Serial No. 852,995.

*To all whom it may concern:*

Be it known that I, JOHN F. O'CONNOR, a citizen of the United States, residing at Chicago, in the county of Cook and State of Illinois, have invented a certain new and useful Improvement in Vehicle Shock-Absorbers, of which the following is a full, clear, concise, and exact description, reference being had to the accompanying drawings, forming a part of this specification.

The object of the invention is, to provide a shock absorber suitable for vehicles, such as automobiles, in which a friction mechanism is employed and so arranged that it gives a substantially uniform frictional resistance during its operation in both directions.

Another object of the invention is, to provide a shock absorber of the type above indicated which is of simple construction, efficient in operation, and composed of few parts.

Figure 1:
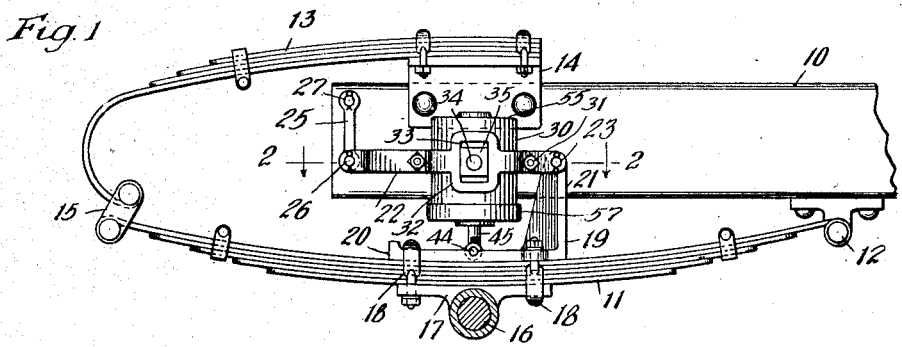
Figure 2:
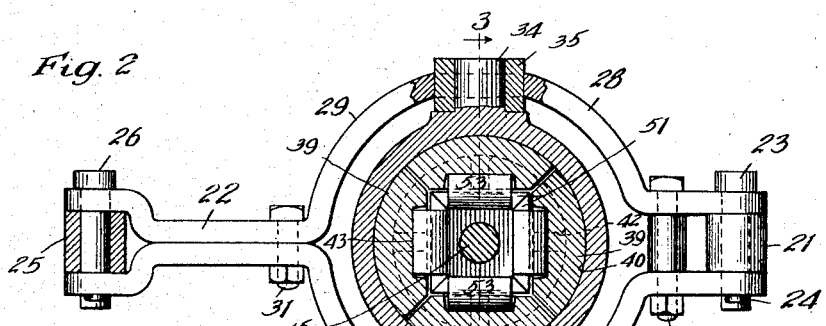
Figure 3:
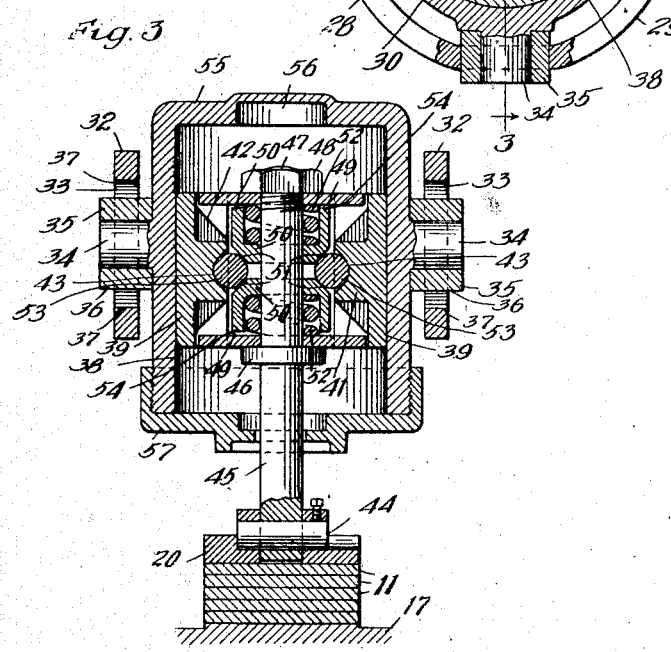

In the drawings forming a part of this specification, Figure 1 is an elevational view of a portion of an automobile chassis and springs showing one form of my improvement in connection therewith; Fig. 2 is an enlarged horizontal sectional view taken substantially on line 2—2 of Fig. 1; and Fig. 3 is a vertical sectional view taken substantially on line 3—3 of Fig. 2.

In said drawings, 10 denotes a portion of the chassis, to which is secured a three-quarter elliptical spring, said spring comprising a lower half member 11 secured to the chassis at 12; and a quarter spring 13 secured to the chassis at 14, said half and quarter springs being connected by a pivotally mounted link 15. The half spring 11 is mounted on the axle 16 by means of a bearing 17 secured to the spring by clamps 18—18, said clamps 18—18 also forming the means for attaching a bracket 19 to said spring. The bracket 19 comprises a horizontal portion 20 and an upward extension 21, the latter, at the top thereof, having pivotally connected thereto a link 22, the pivotal connection being formed by a removable pin or bolt 23 held in place by a cotter 24. The other end of the link, which is described more in detail hereinafter, is pivotally connected to a second link 25 as by means of a removable pin 26, the upper end of the link 25 being similarly pivotally attached to the chassis as at 27.

The link 22 comprises two similar members 28—28, each of which is provided with a semi-circular bowed portion 29, said bowed portions being arranged opposite each other and forming a loop which encircles a friction shell 30 of the shock absorbing device proper. The members 28—28 are securely held together as by means of bolts and nuts 31—31. Each bowed portion 29 is provided with a substantially rectangular enlargement 32 having a rectangular opening 33 therein, the longer dimension of said opening 33 being arranged vertically. The friction shell 30, on the sides thereof, is provided with two diametrically arranged, laterally extended lugs 34, each of which has rigidly secured thereto, by welding or otherwise, a squared member 35, the members 35 fitting within the rectangular recesses 33, and slidable up and down therein, the normal position of the friction shell 30 with respect to the link 22 being such that the upper and lower edges 36 of the members 35 are spaced from the upper and lower faces 37 of the enlargement 32.

The shell 30, on its inner side, is provided with an internal cylindrical friction surface 38, on which slide, and coöperate therewith, a plurality of friction shoes 39, there being four of said shoes in the structure shown, and which are circularly arranged. Each shoe or block 39 is provided with an arcuate outer friction surface 40 which presses directly against the friction surface 38; a horizontal inwardly extending rib 41; vertical strengthening webs 42, the ribs 41 being each provided on their inner face with oppositely arranged wedge-acting faces, shown in the drawing as a curved bearing 43.

Pivotally connected to the horizontal flange 20 of the bracket 19, as by a removable pivot pin 44, is a bolt 45 which extends up into the shell 30, and is provided with an intermediate collar 46 and a threaded end 47 on which is adjustably mounted a nut 48. Mounted on the bolt 45, between the nut 48 and collar 46, are two spring caps or followers, or washers 49, and between the followers 49, and also slidably mounted on the bolt 45, are two hollow wedge members 50. Each wedge member 50 is substantially rectangular in cross section, and is provided with four wedge faces 51, the number of said faces corresponding to the number of friction shoes. On the inside, each wedge member 50 is hollowed out, and is adapted to receive therewithin a spring 52. Between the wedge faces 51 and the adjacent wedge faces on the friction shoes, are interposed anti-friction rollers 53, four in number, to correspond to the number of the shoes. As clearly appears from an inspection of Fig. 3, the length of the wedge members 50 is such that in normal position there is a space, as indicated at 54, between the outer ends of the wedge members and the adjacent spring cap or follower 49, whereby, by tightening the nut 48, an initial compression can be placed upon the springs 52, and, if desired, the followers 49—49 can be brought into direct engagement with the wedges 50—50.

The upper wall 55 of the shell 30 is cut away, as indicated at 56, to accommodate the nut 48 upon extreme movement of the latter, and, at its lower end, the shell 30 is exteriorly threaded to thereby receive a correspondingly threaded removable cap 57, the latter being centrally perforated to permit the bolt 45 to pass therethrough.

The operation is as follows: As will be apparent, upon relative lateral movement between the spring members 11 and 13, the links 22 and 25, and the pivotal connection between the bolt 45 and the lower spring 11, will permit the shock absorbing device to accommodate itself to such movements. Upon movement of the spring members 11 and 13, either toward or from each other, no action takes place in the shock absorbing device until the square members 35—35 reach the limit of their movement within the recesses 33—33, whereupon relative movement between the friction shell 30 and the bolt 45 is caused. When such relative movement takes place, it is apparent that the pressure of both springs 52—52 is transmitted to the shoes through the wedges and rollers, both wedges bearing on the rollers at all times. During this movement, the rollers slightly ascend the inclined planes on the wedges and shoes, depending upon which direction the motion is. On the return or release, the rollers are in the bottom of the V socket formed by the opposed inclined wedging faces.

It will be noted that all lost motion and wear on the parts is automatically taken up by the wedges and springs and also that the inclined roller seats on either the shoes or the wedges may be varied to thereby regulate the frictional resistance. Also, with the arrangement shown, the movement of the shoes and wedges is not limited to the height of the springs such as is true of many shock absorbers, and by having the followers 49—49 closely fill the cylinder, I obtain the advantage of partial atmospheric pressure on the cylinder ends due to the partial vacuum created below.

I am aware that various changes may be made in details of construction and arrangement of the parts, and all such changes and modifications are contemplated as come within the scope of the claims appended hereto.

I claim:—

1. A shock absorber comprising, in combination, a friction shell, friction shoes slidable within said shell, a member having oppositely arranged wedges thereon, said oppositely arranged wedges being movable in unison and in both directions longitudinally of the shell, from normal position, said shoes having coöperating wedge-acting surfaces, and yielding means acting through said wedges to press said shoes against said shell.

2. A shock absorber comprising, in combination, a friction shell, friction shoes slidable therein, a member having oppositely arranged wedges thereon, said oppositely arranged wedges being movable in unison and in both directions longitudinally of the shell, from normal position, said shoes having coöperative wedge-acting surfaces, springs acting through said wedges to press said shoes against the shell, and means for holding said springs under an initial compression.

3. A shock absorber comprising, in combination, a friction shell, friction shoes slidably mounted within said shell, and having wedge-acting faces, a pair of separate and oppositely arranged wedges coöperating with said shoes, springs normally forcing said wedges toward each other, and rollers interposed between said wedges and said shoes.

4. A shock absorber comprising, in combination, a friction shell, friction shoes slidably mounted within said shell, a bolt slidable relatively to said shell and within the latter, a pair of separate and oppositely arranged wedges mounted on said bolt, followers mounted on said bolt, springs interposed between said followers and each of the wedges, said springs being normally under compression, and anti-friction rollers between said wedges and said shoes.

5. A shock absorber comprising a friction shell, friction shoes, oppositely arranged spring pressed wedges, and means for moving said shoes and wedges bodily simultaneously relatively to said shell in opposite directions from normal.

JOHN F. O'CONNOR.

Witnesses:
CARRIE G. RANZ,
ARLINE R. ARNOLD.